(12) United States Patent
Chimner et al.

(10) Patent No.: US 7,849,678 B2
(45) Date of Patent: Dec. 14, 2010

(54) DESULFATION CONTROL STRATEGY

(75) Inventors: Christian Thomas Chimner, Royal Oaks, MI (US); Johannes Walter Reuter, Ypsilanti, MI (US)

(73) Assignee: Eaton Corporation, Cleveland, OH (US)

( * ) Notice: Subject to any disclaimer, the term of this patent is extended or adjusted under 35 U.S.C. 154(b) by 896 days.

(21) Appl. No.: 11/799,252

(22) Filed: May 1, 2007

(65) Prior Publication Data
US 2007/0209351 A1 Sep. 13, 2007

Related U.S. Application Data

(63) Continuation-in-part of application No. 11/455,553, filed on Jun. 19, 2006, now Pat. No. 7,412,823, and a continuation-in-part of application No. 11/293,065, filed on Dec. 2, 2005, now Pat. No. 7,669,408.

(51) Int. Cl.
*F01N 3/00* (2006.01)
(52) U.S. Cl. ............... 60/295; 60/286; 60/299; 60/301
(58) Field of Classification Search ........... 60/273, 60/274, 282, 285, 295
See application file for complete search history.

(56) References Cited

U.S. PATENT DOCUMENTS

| | | | |
|---|---|---|---|
| 6,109,024 A | 8/2000 | Kingusa et al. | |
| 6,530,216 B2 | 3/2003 | Pott | |
| 6,637,189 B1 | 10/2003 | Boegner et al. | |
| 6,718,753 B2 | 4/2004 | Bromberg et al. | |
| 6,732,507 B1 | 5/2004 | Stanglmaier et al. | |
| 7,082,753 B2 * | 8/2006 | Dalla Betta et al. | ........... 60/286 |
| 2004/0040287 A1 | 3/2004 | Beuter et al. | |
| 2004/0076565 A1 | 4/2004 | Gandhi et al. | |
| 2004/0112042 A1 | 6/2004 | Hoffmann et al. | |
| 2005/0109021 A1 | 5/2005 | Noirot et al. | |
| 2006/0010857 A1 | 1/2006 | Hu et al. | |
| 2007/0012032 A1 | 1/2007 | Hu | |
| 2007/0028602 A1 | 2/2007 | Dalla Betta et al. | |
| 2007/0056268 A1 | 3/2007 | McCarthy, Jr. | |
| 2007/0125072 A1 | 6/2007 | McCarthy, Jr. et al. | |

FOREIGN PATENT DOCUMENTS

| | | |
|---|---|---|
| DE | 100 26 762 | 12/2001 |
| WO | WO 00/08312 | 2/2000 |
| WO | WO 00/71864 | 11/2000 |

* cited by examiner

*Primary Examiner*—Thomas E Denion
*Assistant Examiner*—Jesse Bogue
(74) *Attorney, Agent, or Firm*—Paul V. Keller, PLC (57) ABSTRACT

The inventors' concept relates to controlling a power generation system having an exhaust aftertreatment system comprising a fuel reformer and an LNT in series. Over the course of a desulfation, a fuel injection upstream of the fuel reformer is pulsed to create alternating lean and rich phases and control the LNT temperature. The LNT temperature is controlled by manipulating a minimum temperature for the fuel reformer at the end of the lean phase, a length of the lean phase, or a pulse frequency. Preferably, the rich phases end when the fuel reformer reaches a predetermined maximum temperature. The method is effective in regulating the fuel reformer temperature while accurately controlling the LNT temperature.

18 Claims, 2 Drawing Sheets

DESULFATION CONTROL STRATEGY

PRIORITY

This application is a continuation-in-part of U.S. application Ser. No. 11/293,065 filed Dec. 2, 2005 and U.S. application Ser. No. 11/455,553 filed Jun. 19, 2006.

FIELD OF THE INVENTION

The present invention relates to diesel power generation systems with exhaust aftertreatment.

BACKGROUND $NO_x$ emissions from diesel engines are an environmental problem. Several countries, including the United States, have long had regulations pending that will limit $NO_x$ emissions from trucks and other diesel-powered vehicles. Manufacturers and researchers have put considerable effort toward meeting those regulations.

In gasoline powered vehicles that use stoichiometric fuel-air mixtures, three-way catalysts have been shown to control $NO_x$ emissions. In diesel-powered vehicles, which use compression ignition, the exhaust is generally too oxygen-rich for three-way catalysts to be effective.

Several solutions have been proposed for controlling $NO_x$ emissions from diesel-powered vehicles. One set of approaches focus on the engine. Techniques such as exhaust gas recirculation and partially homogenizing fuel-air mixtures are helpful, but these techniques alone will not eliminate $NO_x$ emissions. Another set of approaches remove $NO_x$ from the vehicle exhaust. These include the use of lean-burn $NO_x$ catalysts, selective catalytic reduction (SCR) catalysts, and lean $NO_x$ traps (LNTs).

Lean-burn $NO_x$ catalysts promote the reduction of $NO_x$ under oxygen-rich conditions. Reduction of $NO_x$ in an oxidizing atmosphere is difficult. It has proven challenging to find a lean-burn $NO_x$ catalyst that has the required activity, durability, and operating temperature range. A reductant such as diesel fuel must be steadily supplied to the exhaust for lean $NO_x$ reduction, introducing a fuel economy penalty of 3% or more. Currently, peak $NO_x$ conversion efficiencies for lean-burn $NO_x$ catalysts are unacceptably low.

SCR generally refers to selective catalytic reduction of $NO_x$ by ammonia. The reaction takes place even in an oxidizing environment. The $NO_x$ can be temporarily stored in an adsorbent or ammonia can be fed continuously into the exhaust. SCR can achieve high levels of $NO_x$ reduction, but there is a disadvantage in the lack of infrastructure for distributing ammonia or a suitable precursor. Another concern relates to the possible release of ammonia into the environment.

LNTs are devices that adsorb $NO_x$ under lean exhaust conditions and reduce and release the adsorbed $NO_x$ under rich conditions. An LNT generally includes a $NO_x$ adsorbent and a catalyst. The adsorbent is typically an alkaline earth compound, such as $BaCO_3$ and the catalyst is typically a combination of precious metals including Pt and Rh. In lean exhaust, the catalyst speeds reactions that lead to $NO_x$ adsorption. In a reducing environment, the catalyst speeds reactions by which hydrocarbon reductants are converted to more active species, speeds the water-gas shift reaction, which produces more active hydrogen from less active CO, and speeds reactions by which adsorbed $NO_x$ is reduced and desorbed. In a typical operating protocol, a reducing environment will be created within the exhaust from time-to-time to regenerate (denitrate) the LNT.

Regeneration to remove accumulated $NO_x$ may be referred to as denitration in order to distinguish desulfation, which is carried out much less frequently. A reducing environment can be created in several ways. One approach uses the engine to create a rich exhaust-reductant mixture. For example, the engine can inject extra fuel into the exhaust within one or more cylinders prior to expelling the exhaust. A reducing environment can also be created by injecting a reductant into lean exhaust downstream from the engine. In either case, a portion of the reductant is generally expended reacting with and consuming excess oxygen in the exhaust. To lessen the amount of excess oxygen and reduce the amount of reductant expended consuming excess oxygen, the engine may be throttled, although such throttling may have an adverse effect on the performance of some engines.

Reductant can consume excess oxygen by either combustion or reforming reactions. Typically, the reactions take place upstream of the LNT over an oxidation catalyst or in a fuel reformer. The reductant can also be oxidized directly in the LNT, but this tends to result in faster thermal aging. U.S. Pat. Pub. No. 2004/0050037 (hereinafter "the '037 publication") describes an exhaust system with a fuel reformer placed in an exhaust line upstream from an LNT. The reformer includes both oxidation and steam reforming catalysts. The reformer removes excess oxygen from the exhaust and converts a portion of the diesel fuel reductant into more reactive reformate.

In addition to accumulating $NO_x$, LNTs accumulate $SO_x$. $SO_x$ is the combustion product of sulfur present in ordinarily fuel. Even with reduced sulfur fuels, the amount of $SO_x$ produced by combustion is significant. $SO_x$ adsorbs more strongly than $NO_x$ and necessitates a more stringent, though less frequent, regeneration. Desulfation requires elevated temperatures as well as a reducing atmosphere.

It is desirable to control the LNT temperature closely during desulfation. If the LNT temperature is too low, desulfation takes an excessive length of time, resulting in a high fuel penalty. If the LNT temperature is to high, the catalyst undergoes irreversible deactivation.

The temperature of the exhaust can be elevated by engine measures, particularly in the case of a lean-burn gasoline engine, however, at least in the case of a diesel engine, it is often necessary to provide additional heat to the LNT. Typically, this heat is provided through the same means used to remove excess oxygen from the exhaust. In the '037 publication, heat produced by the upstream fuel reformer is used to heat the downstream LNT to desulfations temperatures. The LNT temperature is then controlled through the fuel reformer temperature. The fuel reformer also provides syn gas, which is more active for desulfation than diesel fuel.

While producing syn gas, the fuel reformer may heat uncontrollably, particularly if the exhaust oxygen concentration is 8% or higher. The '037 publication addresses this problem by pulsing the fuel injection. During rich phases, the fuel reformer produces syn gas and heat. During lean phases, the fuel reformer is allowed to cool. By alternating between lean and rich phases, the fuel reformer temperature can be maintained within a narrow range.

Alternating between lean and rich phases during desulfation is also described in U.S. Pat. No. 6,530,216 ("the '216 patent"), but for an entirely different reason. According to the '216 patent, $SO_x$ is released as $H_2S$ if the reductant concentration is high and the rich phases are long. $H_2S$ release is undesirable due to its powerful and unpleasant odor. Low reductant concentrations are undesirable because desulfation is prolonged. By pulsing the fuel injection to limit the rich phases to 2 to 10 seconds each, high reductant concentrations can be used while releasing $SO_x$ as $SO_2$ rather than $H_2S$.

In spite of advances, there continues to be a long felt need for an affordable and reliable diesel power generation system that is durable, has a manageable operating cost (including fuel penalty), and limits $NO_x$ emissions to a satisfactory extent in the sense of meeting U.S. Environmental Protection Agency (EPA) regulations effective in 2010 and other such regulations.

SUMMARY

The inventors' concept relate to controlling a power generation system having an exhaust aftertreatment system comprising a fuel reformer and an LNT in series. In particular, the invention relates to a method of controlling a fuel injection upstream of the LNT in order to regulate operation of the fuel reformer while controlling the LNT temperature during desulfation.

In one aspect of the inventors' concept, an LNT temperature is controlled to approach a setpoint temperature primarily by manipulating a minimum temperature to which the fuel reformer is allowed to cool between fuel injection periods. Over the course of fuel injection periods (fuel pulses), the fuel reformer heats due to reaction of the fuel to a maximum temperature. The maximum temperature does not vary greatly, or at least not to the same degree as the minimum temperature. Over the periods between fuel pulses, the fuel reformer is allowed to cool until the minimum temperature determined by the control algorithm is reached.

Raising the minimum temperature causes the LNT to heat not so much through the effect on the reformer temperature as though an increased degree of reaction in the LNT. Reductant from rich phases reacts with oxygen from lean phases within the LNT heating the LNT. The extent of this reaction increases as the fuel pulses become shorter. As the LNT is heating, shorter pulses are used. As the setpoint temperature is reached, the pulses lengthen to stabilize the heating rate. The inventors have found this method is excellent at stably maintaining the LNT temperature within a narrow range during desulfation. In addition, the pulse length is kept long for the bulk of the desulfation, which is desirable in terms of ensuring the reductant is used efficiently. While the pulses are relatively long, they are generally still short enough to avoid $H_2S$ production. The fuel reformer is protected from overheating, particularly if the fuel injection pulses are terminated based upon a predetermined maximum fuel reformer temperature being reached.

Adjusting the minimum fuel reformer temperature while fixing the maximum fuel reformer temperature or varying it to a lesser degree causes the pulse frequency to vary. Accordingly, another aspect of the inventors' concept is to control the LNT temperature through the fuel pulse frequency. Preferably the maximum temperature to which the fuel reformer heats with each pulse is kept relatively constant. This can be accomplished by varying the ending points of the lean phases to achieve the desired pulse frequency.

It may also be noted that adjusting the minimum fuel reformer temperature while fixing the maximum fuel reformer temperature or varying it to a lesser degree cause the lengths of the lean phases during which the fuel reformer cools to vary. Accordingly, another aspect of the inventors' concept is to control the LNT temperature through the lengths of the lean phases.

A further aspect of the inventors' concept is a method of operating a power generation system comprising operating a diesel engine to produce a lean exhaust, passing the lean exhaust sequentially through a fuel reformer and then a lean $NO_x$. From time-to-time, the lean $NO_x$ trap is desulfated. Over the course of a desulfation, fuel is provided to the exhaust in such a manner as to alternate between rich periods during which an overall rich exhaust-fuel mixture is provided to the fuel reformer and lean periods during which an overall lean exhaust mixture containing little or no fuel is provided to the fuel reformer. During the rich periods, the fuel reformer produces syn gas and heats. During the lean periods, the fuel reformer cools. As a result the fuel reformer temperature reaches maximums near the ends of the rich phases and minimums near the ends of the lean phases.

According to the method, measurements relating to a temperature of the lean $NO_x$ trap over the course of the desulfation are obtained and used to estimate the temperature of the lean $NO_x$ trap. A manipulated quantity is controlled to cause the estimates to approach a temperature setpoint for the lean $NO_x$ trap. The setpoint is for LNT desulfation. The manipulated quantity comprises a component selected from the group consisting of a minimum temperature for the fuel reformer at the end of the lean phase, a length of the lean phase, and a pulse frequency.

The manipulated quantity can be controlled by any suitable algorithm, such as proportional-integral-differential (PID) control. According to the inventors' concept, proportional and/or integral terms, or the like, will cause the minimum fuel reformer temperature to increase and the pulse frequency to decrease when the estimated temperature of the LNT is less than the setpoint temperature, unless the heating rate is already sufficient, in which case the differential term, or the like, will prevent further increases in the minimum fuel reformer temperature and decreases in the pulse frequency. Likewise, the minimum fuel reformer temperature will decrease and the pulse frequency will increase when the estimated temperature of the LNT is above the setpoint temperature, unless the cooling rate is already sufficient.

The primary purpose of this summary has been to present certain of the inventors' concepts in a simplified form to facilitate understanding of the more detailed description that follows. This summary is not a comprehensive description of every one of the inventors' concepts or every combination of the inventors' concepts that can be considered "invention". Other concepts of the inventors will be conveyed to one of ordinary skill in the art by the following detailed description together with the drawings. The specifics disclosed herein may be generalized, narrowed, and combined in various ways with the ultimate statement of what the inventors claim as their invention being reserved for the claims that follow.

DETAILED DESCRIPTION

Figure 1:
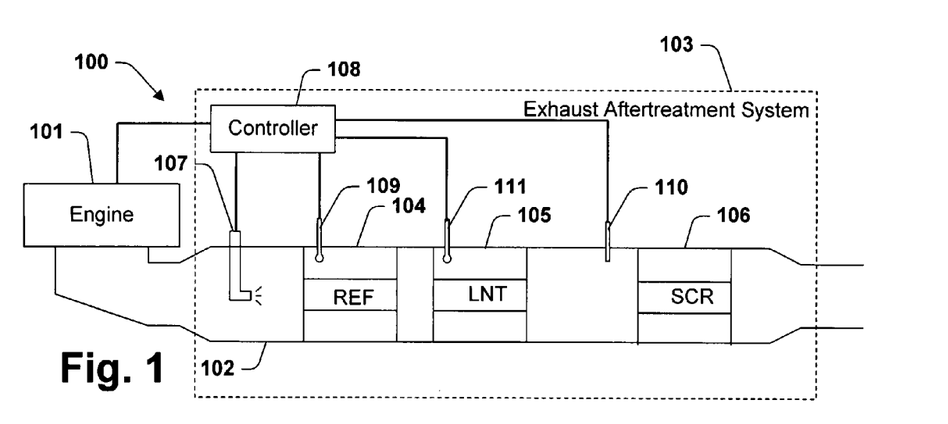
FIG. 1 is schematic illustration of an exemplary power generation system in which the inventors' concept can be implemented.

FIG. 1 is a schematic illustration of a power generation system 100 to which various of the inventors' concepts are applicable. The power generation system 100 is not the only power generation system to which the inventors' concepts are applicable, but the various concepts described herein were originally developed for systems like the system 100 and the individual components of the system 100 pertain to preferred embodiments. The power generation system 100 comprises a diesel engine 101 and an exhaust line 102 in which are configured components of an exhaust aftertreatment system 103. The exhaust aftertreatment system 103 comprises a fuel reformer 104, a lean $NO_x$ trap 105, and an ammonia-SCR catalyst 106. A fuel injector 107 is configured to inject fuel into the exhaust line 102 upstream from the fuel reformer 104. A controller 108 controls the fuel injection based on information about the operating state of the engine 101, a temperature of the fuel reformer 104 measured by a thermocouple 109, and a temperature of the LNT 105 measured by the thermocouple 111. A $NO_x$ concentration measurement obtained by the $NO_x$ sensor 110 is useful for scheduling denitrations.

The diesel engine 101 is a compression ignition engine. A compression ignition diesel engine normally produces exhaust having from about 4 to about 21% $O_2$. An overall rich exhaust-reductant mixture can be formed by injecting diesel fuel into the exhaust during cylinder exhaust strokes, although it is preferred that any reductant be injected into the exhaust downstream from the engine 101. The engine 101 is commonly provided with an exhaust gas recirculation (EGR) system and may also be configured with an intake air throttle, either of which can be used to reduce the exhaust oxygen concentration and lessen the amount of reductant required to produce an overall rich exhaust-reductant mixture. A lean burn gasoline engine or a homogeneous charge compression ignition engine can be used in place of the engine 101. The engine 101 is operative to produce an exhaust that comprises $NO_x$, which consists essentially of NO and $NO_2$.

The engine 101 is generally a medium or heavy duty diesel engine. The inventors' concepts are applicable to power generation systems comprising light duty diesel and lean burn gasoline engines, but the performance demands of exhaust aftertreatment systems are generally greater when the engine is a medium or heavy duty diesel engine. Minimum exhaust temperatures from lean burn gasoline engines are generally higher than minimum exhaust temperatures from light duty diesel engines, which are generally higher than minimum exhaust temperatures from medium duty diesel engines, which are generally higher than minimum exhaust temperatures from heavy duty diesel engines. Lower exhaust temperatures make $NO_x$ mitigation more difficult and fuel reformers harder to light off. A medium duty diesel engine is one with a displacement of at least about 4 liters, typically about 7 liters. A heavy duty diesel engine is one with a displacement of at least about 10 liters, typically from about 12 to about 15 liters.

The exhaust from the engine 101 is channeled by a manifold to the exhaust line 102. The exhaust line 102 generally comprises a single channel, but can be configured as several parallel channels. The exhaust line 102 is preferably configured without exhaust valves or dampers. In particular, the exhaust line 102 is preferably configured without valves or dampers that could be used to vary the distribution of exhaust among a plurality of LNTs 105 in parallel exhaust channels. The inventors' concepts are applicable to aftertreatment systems with exhaust valves or dampers, but the presence of exhaust valves or dampers can considerably alter the consideration that go into managing LNT regeneration. Valves or dampers can be used to reduce the exhaust flow to a fuel processor or LNT, which simplifies controlling the LNT environment for regeneration. Nevertheless, it is preferred that the exhaust line 102 be configured without valves or dampers because these moving parts are subject to failure and can significantly decrease the durability and reliability of an exhaust aftertreatment system.

Even when the exhaust line 102 is free from exhaust valves or dampers, an exhaust line upstream from the exhaust line 102 may still contain an exhaust valve, such as an exhaust gas recirculation (EGR) valve in an EGR line. Exhaust valves suitable for a main exhaust line to divert a majority of the exhaust flow are more problematic than exhaust valves suitable to control the flow through a side branch off a main exhaust line. Exhaust valves for larger conduits are more subject to failure than exhaust valves for smaller conduits.

The exhaust line 102 is provided with an exhaust line fuel injector 107 to create rich conditions for LNT regeneration. The inventors' concepts are applicable to other method's of creating a reducing environment for regenerating the LNT 105, including engine fuel injection of reductant and injection of reductants other than diesel fuel. Nevertheless, it is preferred that the reductant is the same diesel fuel used to power the engine 101. It is also preferred that the reductant be injected into the exhaust line 102, rather than into the cylinders of engine 101, in order to avoid oil dilution caused by fuel passing around piston rings and entering the oil gallery. Additional disadvantages of cylinder reductant injection include having to alter the operation of the engine 101 to support LNT regeneration, excessive dispersion of pulses of reductant, forming deposits on any turbocharger configured between the engine 101 and the exhaust line 102, and forming deposits on any EGR valves.

The diesel fuel is injected into the exhaust line 102 upstream from a fuel reformer 104. The fuel reformer 104 comprises an effective amount of precious metal catalyst, including rhodium, to catalyze oxidation and steam reforming reactions at 600° C. The fuel reformer 104 is designed with low thermal mass, whereby it can be easily heated to steam reforming temperatures for each LNT regeneration. Low thermal mass is typically achieved by constructing the fuel reformer 104 around a thin metal substrate. A thin metal substrate has a thickness that is about 100 μm or less, preferably about 50 μm or less, and still more preferably about 25 μm or less.

Steam reforming temperatures are at least about 500° C., which is generally above diesel exhaust temperatures. Diesel exhaust temperatures downstream from a turbocharger vary from about 110 to about 550° C. Preferably, the fuel reformer 104 can be warmed up and operated using diesel fuel from the injector 107 stating from an initial temperature of 275° C. while the exhaust from the engine 101 remains at 275° C. More preferably, the fuel reformer 104 can be warmed up and operated from initial exhaust and reformer temperatures of 225° C., and still more preferably from exhaust and reformer temperatures of 195° C. These properties are achieved by providing the fuel reformer 104 with effective amounts of precious metals, such as Pt and/or Pd, for catalyzing oxidizing diesel fuel at the starting temperatures. Low temperature start-up can also be improved by configuring a low thermal mass precious metal oxidation catalyst upstream from the fuel reformer 104. Preferably, the upstream catalyst combusts a portion of the fuel while vaporizing the rest. A mixing zone between the upstream catalyst and the fuel reformer 104 is also helpful.

Having the fuel reformer 104 operate at steam reforming temperatures reduces the total amount of precious metal catalyst required. Less precious metal catalyst is required when reforming at steam reforming temperatures as compared to reforming diesel fuel at exhaust temperatures regardless of whether reforming is through partial oxidation and stream reforming or exclusively though partial oxidation reactions.

Having the fuel reformer 104 operate at least partially through steam reforming reactions significantly increases the reformate yield and reduces the rate of heat generation. In principal, if reformate production proceeds through partial oxidation reforming as in the reaction:

$$CH_{1.85} + 0.5O_2 \rightarrow CO + 0.925H_2 \quad (1)$$

1.925 moles of reformate (moles CO plus moles $H_2$) could be obtained from each mole of carbon atoms in the fuel. $CH_{1.85}$ is used to represent diesel fuel having a typical carbon to hydrogen ratio. If reformate production proceeds through steam reforming as in the reaction:

$$CH_{1.85} + H_2O \rightarrow CO + 1.925H_2 \quad (2)$$

2.925 moles of reformate (moles CO plus moles $H_2$) could in principle be obtained from each mole of carbon atoms in the fuel. In practice, yields are lower than theoretical amounts due to the limited efficiency of conversion of fuel, the limited selectivity for reforming reactions over complete combustion reactions, the necessity of producing heat to drive steam reforming, and the loss of energy required to heat the exhaust.

Preferably, the fuel reformer 104 comprises enough steam reforming catalyst that at 600° C., with an 8 mol % exhaust oxygen concentration from the engine 101 and with sufficient diesel fuel to provide the exhaust with an overall fuel to air ratio of 1.2:1, at least about 2 mol % reformate is generated by steam reforming, more preferably at least about 4 mol %, and still more preferably at least about 6 mol %. For purposes of this disclosure, functional descriptions involving diesel fuel are tested on the basis of the No. 2 diesel fuel oil sold in the United States, which is a typical diesel fuel.

An LNT is a device that adsorbs $NO_x$ under lean conditions and reduces and releases $NO_x$ under rich conditions. An LNT generally comprises a $NO_x$ adsorbent and a precious metal catalyst in intimate contact on an inert support. Examples of $NO_x$ adsorbent materials include certain oxides, carbonates, and hydroxides of alkaline earth metals such as Mg, Ca, Sr, and Ba or alkali metals such as K or Cs. The precious metal typically consists of one or more of Pt, Pd, and Rh. The support is typically a monolith, although other support structures can be used. The monolith support is typically ceramic, although other materials such as metal and SiC are also suitable for LNT supports. The LNT 105 may be provided as two or more separate bricks.

The ammonia-SCR catalyst 106 is functional to catalyze reactions between $NO_x$ and $NH_3$ to reduce $NO_x$ to $N_2$ in lean exhaust. The ammonia-SCR catalyst 106 adsorbs $NH_3$ released from the LNT 105 during denitration and subsequently uses that $NH_3$ to reduce $NO_x$ slipping from the LNT 105 under lean conditions. Examples of ammonia-SCR catalysts include certain oxides of metals such as Cu, Zn, V, Cr, Al, Ti, Mn, Co, Fe, Ni, Mo, W, and Ce and zeolites, such as ZSM-5 or ZSM-11, substituted with metal ions such as cations of Cu, Co, Ag, or Zn. Preferably the SCR catalyst 106 is substantially free of precious metals. Preferably, the ammonia-SCR catalyst 106 is designed to tolerate temperatures required to desulfate the LNT 105.

The exhaust aftertreatment system 100 can comprise other components, such a diesel particulate filter and a clean-up oxidation catalyst. A thermal mass can be placed between the fuel reformer 104 and the LNT 105 to protect the LNT 105 from heating to steam reforming temperatures with every denitration. A diesel particulate filter can be used as the thermal mass.

During normal operation (a lean phase), the engine 101 is operated to produce an exhaust comprising $NO_x$, particulate matter, and excess oxygen. A portion of the $NO_x$ is adsorbed by the LNT 105. The ammonia-SCR catalyst 106 may have ammonia stored from a previous denitration of the LNT 105. If the ammonia-SCR catalyst 106 contains stored ammonia, an additional portion of the $NO_x$ is reduced over the ammonia-SCR catalyst 106 by reaction with stored ammonia. The fuel injector 107 is generally inactive over this period, although small fuel injections might be used to maintain the fuel reformer 104 at a temperature from which it can be easily heated or to maintain the lean $NO_x$ trap 105 at a temperature at which it effectively absorbs $NO_x$.

From time-to-time, the LNT 105 must be regenerated to remove accumulated $NO_x$ (denitrated) in a rich phase. Denitration generally involves heating the reformer 104 to an operational temperature and then using the reformer 104 to produce reformate. The reformer 104 is generally heated by injecting fuel into the exhaust upstream from the fuel reformer 104 at a sub-stoichiometric rate, whereby the exhaust-reductant mixture remains overall lean and most of the injected fuel completely combusts in the reformer 104. This may be referred to as a lean warm-up phase. Once combustion has heated the reformer 104, the fuel injection rate can be increased to make the exhaust-reductant mixture overall rich, whereupon the reformer 104 consumes most of the oxygen from the exhaust and produces reformate by partial oxidation and steam reforming reactions. The reformate thus produced reduces $NO_x$ absorbed in the LNT 105. Some of the $NO_x$ may be reduced to $NH_3$, which is absorbed and stored by the ammonia-SCR catalyst 106.

From time to time, the LNT 105 must be regenerated to remove accumulated sulfur compounds (desulfated). Desulfation involves heating the fuel reformer 104 to an operational temperature, heating the LNT 105 to a desulfating temperature, and providing the heated LNT 105 with a rich atmosphere. Desulfating temperatures vary, but are typically in the range from about 500 to about 800° C., with optimal temperatures typically in the range of about 650 to about 750° C. Below a minimum temperature, desulfation is very slow. Above a maximum temperature, the LNT 105 may be damaged.

Denitration and desulfation scheduling are carried out by the controller 108, which provides a control signal once the criteria for initiating a denitration have been met. The controller 108 may also provide a control signal once criteria marking the end of denitration have been met. The controller 108 may be an engine control unit or may be a separate device. Criteria for initiating denitration of the LNT 105 generally relate to the state and or $NO_x$ mitigating performance of the exhaust aftertreatment system 103 or a portion thereof comprising the LNT 105. A state of the exhaust aftertreatment system 103 can relate to the $NO_x$ loading or remaining $NO_x$ storage capacity of the LNT 105. The point of initiating denitration may be varied to advance the timing of denitration when conditions are opportune for denitrating or to postpone denitration when the current level of demand for $NO_x$ mitigation created by the engine 101 is below peak.

Criteria for initiating desulfation generally relate to the state of the LNT 105. In one example, desulfation is initiated based on an estimate of the amount of sulfur stored in the LNT 105. The amount of accumulated sulfur can be estimated, for example, by integrating the product of an estimate of the engine's $SO_x$ production rate by an estimate of the LNT 105's $SO_x$ adsorption efficiency. The engine's $SO_x$ production rate can be estimated based on the amount of fuel consumed. In another example, desulfation is initiated after a fixed period of engine operation, or after a fixed number of denitrations. In a further example, desulfation is initiating based on the $NO_x$ mitigation performance of the exhaust aftertreatment system 105 or some portion thereof comprising the LNT 105 having fallen to some critical level. As with denitration, the point of initiating desulfation may be varied to advance the timing of desulfation when conditions are opportune for desulfating or to postpone desulfation when the current level of demand for $NO_x$ mitigation created by the engine 101 is below peak. Conditions are generally considered opportune when the LNT 105 can be desulfated with a comparatively low fuel penalty. For example, it is often opportune to denitrate the LNT 105 when normal engine operation is resulting in a period of comparatively low exhaust oxygen flow rate.

Desulfating the LNT 105 involves heating the LNT 105 to desulfation temperatures and providing the LNT 105 with an overall rich reductant-exhaust mixture. A primary mechanism of heating the LNT 105 is heat convection from the fuel reformer 104; the fuel reformer 104 is heated and the exhaust gas is allowed to carry the heat downstream to the LNT 105. Another mechanism of heating the LNT 105, which is highly pertinent to the inventors' concept, is combustion within the LNT 105.

Combustion within the LNT 105 can occur through the reaction of reductants provided to the LNT 105 under overall rich conditions with oxygen provided to the LNT 105 under overall lean conditions. Reductants, such as syn gas and unreformed or partially reformed fuel, slip to the LNT 105 during rich phases. These reductants can react during the rich phases with oxygen stored in the LNT 105 from a previous lean phase. This mechanism can be promoted by providing the LNT 105 with oxygen storage capacity. Alternatively or in addition, reductants can be adsorbed and stored in the LNT 105 during the rich phase and react with oxygen provided to the LNT 105 during the lean phases. Hydrocarbons are better candidates for adsorption and storage than syn gas. This mechanism can be promoted by providing the LNT 105 with hydrocarbon adsorption capacity. Allowing some hydrocarbon slip from the fuel reformer 104 can be desirable in promoting this mechanism. Other mechanisms may result in combustion, including mixing of gases from lean and rich phases and storage of reductants or oxygen on walls or other locations upstream from the LNT 105. Regardless of the mechanism, the extent of heating by combustion within the LNT 105 is susceptible to control through the frequency of transition between lean and rich phases.

The pulsing of fuel injection to alternate between lean and rich phases, which causes combustion and heating in the LNT 105, is desirable during desulfation for several reasons. Pulsing is desirable as a way of controlling the rate at which the fuel reformer 104 heats and as a way of mitigating $H_2S$ release from the LNT 105. According to the inventors' concept, pulsing is further desirable in that it can be used to control the temperature of the LNT 105 independently from the temperature of the fuel reformer 104. If desired, the LNT 105 can be operated at a higher temperature than the fuel reformer 104, whereby the fuel reformer 104 can be operated in a temperature range most suited to its preservation and performance while the LNT 105 can be operated in a temperature range most suited to its preservation and desulfation. Pulsing can also have disadvantages such as extending the desulfation period and wasting reductant, but these disadvantages are mitigated in the inventors' preferred embodiments and offset by the advantages.

One way of looking at the inventors' concept is in terms of minimum and maximum reformer temperatures. Regardless of how the reformer and LNT temperatures are controlled, the reformer temperature peaks near the ends of the rich phases and reaches minimums near the ends of the lean phases. In the prior art, when a higher LNT temperature was desired, the reformer 104 would be heated. Whether or not the control strategy looked at fuel reformer temperatures, both the minimum and the maximum would rise as no systematic changes in the pulse frequency were designed; any changes to the pulse frequency would be incidental and small. By contrast, according to the inventors' concept, pulse frequency changes are paramount whether or not the pulse frequency is explicitly treated as the manipulated quantity. When the pulse frequency is changed, the minimum and maximum temperatures change at different rates. Preferably, the maximums change half or less as rapidly as the minimums, whereby the pulse frequency changes can be expected to substantially impact the LNT temperature.

A preferred embodiment in which the pulse frequency is substantially varied without explicitly treating the pulse frequency in the control equations is to control the LNT temperature by manipulating the minimum reformer temperature while keeping the maximum reformer temperature substantially unchanged. In this embodiment, the rich phases extend until the arrival or imminent approach of a predetermined peak reformer temperature. The lean phases begin when the rich phases end. The lean phases continue until the arrival or imminent approach of the predetermined minimum reformer temperature.

In this embodiment, the predetermined minimum is manipulated based on a difference between an estimated LNT temperature and a setpoint (target) LNT temperature. If the estimate is below the setpoint, the minimum reformer temperature is raised, unless the LNT temperature is already rising sufficiently rapidly in which case a further acceleration of the rise could result in overshoot. If the estimated LNT temperature is above the setpoint, the minimum reformer temperature is lowered, except when the estimates are considered to be decreasing sufficiently rapidly. The minimum reformer temperature is increased to raised a rate of LNT temperature increase and the minimum reformer temperature is decreased to lower a rate of LNT temperature increase. Increasing the minimum reformer temperature while keeping the maximum reformer temperature constant increases the pulse frequency. Lowering the minimum reformer temperature while keeping the maximum reformer temperature constant decreases the pulse frequency While the temperature of the LNT 105 is measured very frequently, the minimum reformer temperature can have only one value each fuel pulse period; there is little to be gained by adjusting the minimum reformer temperature more then once each period. Since the minimum reformer temperature needs to be set only once each period, only one LNT temperature is needed from each period. Any suitable temperature can be used, but it is preferred that the temperature used be the peak LNT temperature reached over the preceding period.

Figure 2:
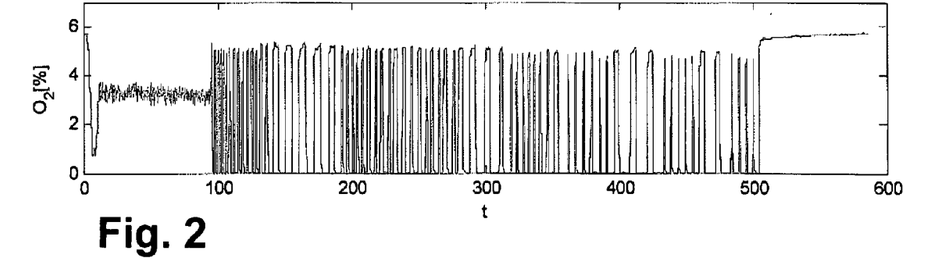
FIG. 2 is a plot of the exhaust oxygen concentration at the outlet of an LNT over the course of a desulfation controlled using the inventors' concept.
Figure 3:
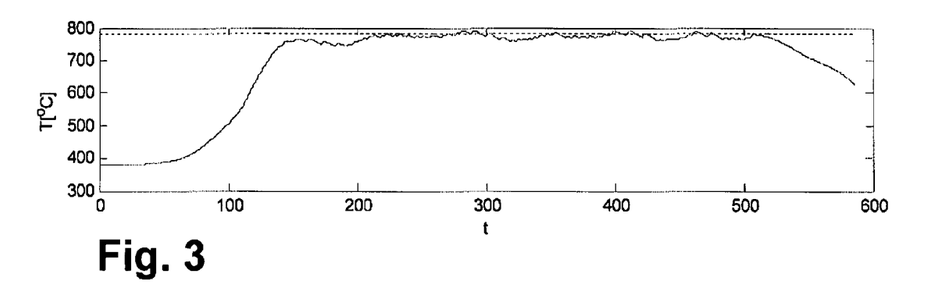
FIG. 3 is a plot of measured and setpoint LNT temperatures over the course of a desulfation controlled using the inventors' concept.
Figure 4:
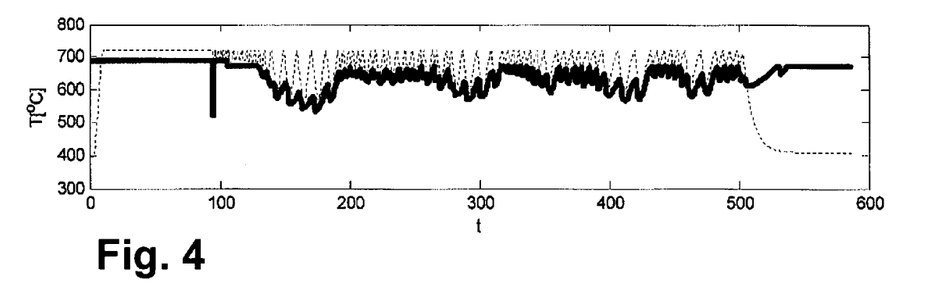
FIG. 4 is a plot of fuel reformer brick and coolant temperatures over the course of a desulfation controlled using the inventors' concept.

FIGS. 2-4 are plots showing the results of an application of this embodiment to a system like the power generation system 100. FIG. 2 is a plot of the exhaust oxygen concentration at the outlet of the LNT 105. For approximately the first 100 seconds, the exhaust is continuously lean. Fuel injection over this period is used to heat the fuel reformer 104. After about 100 seconds, pulsing to create alternating lean and rich phases begins. Initially the pulsing is relatively rapid, which causes the LNT 105 to heat. As the LNT 105 approaches its setpoint temperature, pulsing slows considerably. The pulse frequency continues to vary substantially to control the LNT temperature through the desulfation cycle, but the pulse frequency remains relatively low compared to the initial warm-up period.

FIG. 3 plots the resulting LNT temperature (solid line) and the LNT setpoint temperature (dashed line). Once the LNT 104 is heated, it remains within from about 10 to about 30° C. of the setpoint. The overshoots above the setpoint are considerably smaller than the overshoots below the setpoint, which is desirably in that the risk of thermal deactivation due to overheating is kept very low. The LNT temperature never rises more than about 10° C. over the setpoint.

FIG. 4 plots the fuel reformer brick temperature (dashed line) and the temperature of a fuel reformer coolant (solid line). The coolant is used in the experimental setup, but not in a typical commercial application. FIG. 4 shows that the temperature variations of the fuel reformer 104 are large in comparison to those of the LNT 105. The minimum reformer temperatures are much higher during periods of LNT 105 heating as compared to periods where the LNT 105 is at its setpoint temperature. The differences between minimum and maximum fuel reformer temperatures are much smaller during periods of LNT 105 heating as compared periods where the LNT 105 is at its setpoint temperature.

Temperature estimates are based on sensor data. It is known that sensors do not provide strictly accurate information and it is usual to process sensor data in various ways to obtain estimates used in control algorithms. The data from the temperature sensors 109 and 111 can be inaccurate due to random perturbations and noise that affects the measurements. Data can also be inaccurate in that it is not current due to lag in obtaining measurements. In general, the data is processed through a state estimator, which can be any algorithm used to determine the state of a system from data. A state estimator can be a simple filter or it can use a model of the system, in which case it may be referred to as an observer. State estimators can operate in numerous ways, e.g., providing moving time averages, discarding outliers in a sequence of measurements, and/or estimating the state in a manner that balances what can be expected based on a model with what the sensor is asserting.

A state estimator can be used to compensate for lag in measuring reformer temperatures. One type of lag is the lag in obtaining sensor readings. Correcting for this lag involves estimating the current reformer temperature based on a sequence of slightly outdated temperature measurements. Compensating for this type of lag can be accomplished with a simple extrapolation and knowledge of the measurement delay. Another type of lag is the lag in the system's response to a change. When the fuel injection is cut off, the reformer temperature does not immediately stop rising. It continues to rise for a short period due to hydrocarbon already in the system. In particular, it has been found that some hydrocarbon adsorbs into a typical fuel reformer during the rich phases. This adsorbed hydrocarbon is a principle cause of heating after the termination of fuel injection.

One way to compensate for lag in the system response is to estimate the fuel reformer temperature with an observer that uses a model having artificially accelerated dynamics. A preferred model is a lumped parameter model capturing the significant contributions to the fuel reformer temperature. These contributions include heat convection into the fuel reformer 104, heat convection out of the fuel reformer 104, heat loss to the surroundings, heat generation by reaction of injected fuel, heat generation by combustion of absorbed fuel, and uptake of heat by the reformer 104. By accelerating the model dynamics, the estimate of the reformer temperature at the end of the rich phase becomes in effect an estimate of the peak temperature the fuel reformer 104 will reach. Accordingly, this approach allows the maximum reformer temperature to be controlled more accurately, which allows the fuel reformer 104 to be operated nearer its peak design temperatures while minimizing the risk of overheating the fuel reformer 104.

Another embodiment of the inventors' concept in which the pulse frequency is manipulated without explicitly treating the pulse frequency in the control equations is to control the LNT temperature by manipulating the duration of the lean phase. If an estimated LNT temperature is below the setpoint, the duration of the lean phases is reduced, unless the estimated LNT temperature is already rising sufficiently rapidly. If the estimated LNT temperature is above the setpoint, the duration of the lean phases is increased, except when the estimates are considered to be decreasing sufficiently rapidly. The duration of the lean phases is reduced to raise a rate of LNT temperature increase and the duration of the lean phases is increased to lower a rate of LNT temperature increase. The duration of the rich phases can be determined in any suitable manner, but is generally determined in a manner independent of the LNT temperature. The rich phases could extend for a fixed interval or until a predetermined maximum reformer temperature is reached, for example. Lengthening the lean phases will reduce the pulse frequency while shortening the lean phases will increase the pulse frequency.

In a further embodiment of the inventors' concept, the pulse frequency is directly controlled. A commanded pulse frequency can be implemented by using it to determine the endpoints for the lean phases. The endpoints for the rich phases can then be defined in any suitable manner, although preferably the ends of the rich phases are defined based on a predetermined maximum fuel reformer temperature being reached. If an estimated LNT temperature is below the setpoint, the pulse frequency is reduced, unless the estimated LNT temperature is already rising sufficiently rapidly. If the estimated LNT temperature is above the setpoint, the pulse frequency is increased, except when the estimates are considered to be decreasing sufficiently rapidly. The pulse frequency is increased to accelerate a rate of LNT temperature increase and the pulse frequency is reduced to reduce a rate of LNT temperature increase.

From the foregoing discussion, it can be seen that one aspect of the inventors' concept is a method of controlling a variable related to the LNT temperature by manipulating a variable comprising one or more of a minimum temperature for the fuel reformer at the end of the lean phase, a length of the lean phase, and a pulse frequency. The expression "a variable comprising" is used to account for cases such as that in which the variable is a vector having one component that is a member of the enumerated list. For example, the manipulated quantity can be a vector for which a basis function is a one degree decrease in the minimum fuel reformer temperature and a one quarter degree increase in the fuel reformer maximum temperature, whereby the minimum and maximum fuel reformer temperatures are manipulated in a coupled fashion. This example is not a preferred embodiment, but could nevertheless be an effective implementation of the inventors' concept. In the preferred embodiments, the maximum fuel reformer temperature is kept substantially constant.

Implementation of the inventors' concepts causes the minimum and maximum fuel reformer temperatures to differ to a lesser extent during LNT heating and to a greater extent when the LNT 105 is near its setpoint temperature. During LNT heating, the minimum and maximum reformer temperatures reached over the course of a fuel pulse typically differ by from about 10 to about 60° C., more typically from about 20 to about 40° C. Once the LNT 105 is near its setpoint temperature, the minimum and maximum reformer temperatures typically differ by from about 50 to about 120° C., more typically from about 70 to about 100° C. Preferably, the controller 108 sets a minimum different between the minimum and maximum reformer temperatures, or a related quantity such as a maximum pulse frequency or minimum lean phase duration. A minimum difference is typically at least about 10° C., more typically at least about 20° C.

Any suitable control strategy can be used to set the manipulated variable based on the error, which is defined as the difference between a LNT temperature estimated based on measurement and a setpoint for that temperature. An exemplary control strategy is a PID control strategy. In a PID control strategy, the manipulated variable is set based on the sum of a first term that is proportional to the error, a second term that is proportional to the integral of the error, and a third term that is proportional to the derivative of the error. The proportional term contributes a factor tending to set the pulse frequency progressively lower as the LNT temperature increases. The integral term contributes a factor tending the raise the pulse frequency whenever the LNT temperature is below the setpoint. The integral term is generally limited to prevent controller wind-up, which is an excessive increase in the integral term that can result if the controller is unable to bring the error to zero for a long period. The derivative term contributes a factor tending to increase the pulse frequency when the LNT temperature is rising. The derivative term mitigates overshoot of the setpoint and oscillation around the setpoint.

The pulse frequency is at least low enough to create clearly distinct lean and rich phases. The phases are distinct in that during the lean phases the exhaust-fuel mixture entering the fuel reformer 104 is overall rich and the exhaust-fuel mixture entering the fuel reformer 104 is overall lean. This is in contrast to the rapid pulsing used to control fuel injection rates in some fuel dosing systems. The pulsing used to control fuel injection rates is so rapid that it is essentially equivalent to a continuous injection and the exhaust-fuel mixture entering the reformer does not alternate between overall lean and overall rich with each of these very short pulse periods.

The invention as delineated by the following claims has been shown and/or described in terms of certain concepts, components, and features. While a particular component or feature may have been disclosed herein with respect to only one of several concepts or examples or in both broad and narrow terms, the components or features in their broad or narrow conceptions may be combined with one or more other components or features in their broad or narrow conceptions wherein such a combination would be recognized as logical by one of ordinary skill in the art. Also, this one specification may describe more than one invention and the following claims do not necessarily encompass every concept, aspect, embodiment, or example described herein.

The invention claimed is:

1. A method of operating a power generation system, comprising:
   operating a diesel engine to produce a lean exhaust comprising $NO_x$;
   passing the lean exhaust sequentially through a fuel reformer and then a lean $NO_x$ trap that adsorbs a portion of the $NO_x$ from the exhaust;
   from time-to-time, desulfating the lean $NO_x$ trap;
   during the desulfations, pulsing a fuel injection into the exhaust upstream from the fuel reformer whereby the pulsations results in an exhaust-fuel mixture entering the fuel reformer alternating between overall lean and overall rich;
   beginning the individual fuel pulses according to a first criteria;
   ending the individual fuel pulses according to a second criteria;
   obtaining from measurements a temperature of the lean $NO_x$ trap over the course of the desulfation; and
   controlling the temperature of the lean $NO_x$ trap by varying the first criteria;
   wherein the second criteria relates to the fuel reformer approaching a maximum temperature and is independent of the temperature of the lean $NO_x$ trap.

2. The method of claim 1, wherein the first criteria is the fuel reformer having cooled to a certain temperature.

3. The method of claim 1, wherein the measurements are obtained by a temperature measuring device positioned within or downstream from the lean $NO_x$ trap.

4. A power generation system configured to implement the method of claim 1.

5. The method of claim 1, wherein no fuel is injected into the exhaust between pulses.

6. A method of operating a power generation system, comprising:
   operating a diesel engine to produce a lean exhaust comprising $NO_x$;
   passing the lean exhaust sequentially through a fuel reformer and then a lean $NO_x$ trap that adsorbs a portion of the $NO_x$ from the exhaust;
   from time-to-time, desulfating the lean $NO_x$ trap;
   over the course of a desulfation, alternating between rich periods during which an overall rich exhaust-fuel mixture is provided to the fuel reformer, the fuel reformer produces syn gas, and the fuel reformer heats and lean periods during which an overall lean exhaust mixture containing little or no fuel is provided to the fuel reformer and the fuel reformer cools, whereby the fuel reformer temperature reaches maximums near the ends of the rich phase and minimums near the ends of the lean phases;
   obtaining measurements relating to a temperature of the lean $NO_x$ trap over the course of the desulfation and using the measurements to estimate the temperature of the lean $NO_x$ trap;
   comparing the estimates to a desulfation temperature setpoint for the lean $NO_x$ trap; and
   causing the estimates to approach the setpoint by manipulations that cause the minimum fuel reformer temperatures to change;
   wherein the maximum fuel reformer temperatures do not change or change half or less as rapidly as the minimums change;
   the manipulations cause differences between the maximum fuel reformer temperatures and the minimum fuel reformer temperatures to decrease when the estimates are below the setpoint, except optionally when the estimates are rising sufficiently rapidly; and
   the manipulations cause the differences between the maximum fuel reformer temperatures and the minimum fuel reformer temperatures to increase when the estimates are above the setpoint, except optionally when the estimates are decreasing sufficiently rapidly.

7. The method of claim 6, wherein the lean phases are ended in response to an estimate of a temperature of the fuel reformer reaching a predetermined minimum.

8. The method of claim 7, wherein the minimum is lowered to cause the temperature of the lean $NO_x$ trap to decrease and raised to cause the temperature of the lean $NO_x$ trap to increase.

9. The method of claim 6, wherein the rich phases are ended in response to the estimate of the temperature of the fuel reformer reaching a predetermined maximum.

10. The method of claim 9, wherein the predetermined maximum remains constant as the minimum is varied in response to the comparisons between the estimates and the setpoint.

11. A power generation system configured to implement the method of claim 6.

12. A method of operating a power generation system, comprising:
- operating a diesel engine to produce a lean exhaust comprising $NO_x$;
- passing the lean exhaust sequentially through a fuel reformer and then a lean $NO_x$ trap that adsorbs a portion of the $NO_x$ from the exhaust;
- from time-to-time, desulfating the lean $NO_x$ trap;
- over the course of a desulfations, alternating between rich periods during which an overall rich exhaust-fuel mixture is provided to the fuel reformer, the fuel reformer produces syn gas, and the fuel reformer heats and lean periods during which an overall lean exhaust mixture containing little or no fuel is provided to the fuel reformer and the fuel reformer cools, whereby the fuel reformer temperature reaches maximums near the ends of the rich phases and minimums near the ends of the lean phases;
- obtaining measurements relating to a temperature of the lean $NO_x$ trap over the course of the desulfation and using the measurements to estimate the temperature of the lean $NO_x$ trap; and
- controlling a manipulated variable that affect the minimums in the fuel reformer temperature in order to cause the estimates to approach a desulfation temperature setpoint for the lean $NO_x$ trap while controlling the rich periods to keep the maximums in the fuel reformer temperature substantially unvarying;
- wherein the manipulated variable comprises one or more of a minimum temperature for the fuel reformer at the end of the lean phase, a duration of the lean phase, and a pulse frequency.

13. The method of claim 12 wherein the manipulated variable is the minimum temperature for the fuel reformer at the end of the lean phase.

14. The method of claim 12 wherein the manipulated variable is the duration of the lean phase.

15. The method of claim 12 wherein the manipulated variable is the pulse frequency.

16. The method of claim 12, wherein the rich periods are ended based on the fuel reformer approaching a pre-determined maximum temperature.

17. The method of claim 16, wherein the pre-determined maximum temperature is set independently of the obtained temperature of the lean $NO_x$ trap.

18. A power generation system configured to implement the method of claim 12.

* * * * *